United States Patent [19]

Noguchi

[11] Patent Number: 4,694,164
[45] Date of Patent: Sep. 15, 1987

[54] LIGHT BEAM SCANNING APPARATUS

[75] Inventor: Masaru Noguchi, Kanagawa, Japan

[73] Assignee: Fuji Photo Film Co., Ltd., Kanagawa, Japan

[21] Appl. No.: 936,939

[22] Filed: Dec. 1, 1986

Related U.S. Application Data

[63] Continuation of Ser. No. 724,722, Apr. 18, 1985, abandoned.

[30] Foreign Application Priority Data

Apr. 18, 1984 [JP]  Japan .................................. 59-78230

[51] Int. Cl.⁴ .............................................. H01J 5/02
[52] U.S. Cl. ...................................... 250/234; 358/293
[58] Field of Search ........................ 250/234, 235, 236; 350/6.6, 6.7, 6.8; 358/206, 293

[56] References Cited

U.S. PATENT DOCUMENTS 4,404,596  9/1983  Juergensen et al. ................. 358/293
4,564,757  1/1986  La Budde et al. ............... 250/234 X Primary Examiner—Eugene R. LaRoche
Assistant Examiner—Steven J. Mottola
Attorney, Agent, or Firm—Sughrue, Mion, Zinn, Macpeak and Seas

[57] ABSTRACT

In a light beam scanning apparatus for scanning a light beam by use of a mechanical deflector such as a galvanometer mirror or a rotating polygonal mirror, the deviation of the light beam in the direction perpendicular to the scanning direction is corrected by a correcting light beam deflector. The correcting light beam deflector is driven by a control circuit in which a correcting signal is input. The correcting signal is obtained by a position detector which detects the position of a light beam scanned in correspondence with the scanning light beam. The position detecting light beam and the scanning light beam are caused to impinge upon the same point or points coincident with each other on a light deflector such as a galvanometer or a polygonal mirror so that the position detecting light beam may be deflected or deviated in correspondence with the scanning light beam.

6 Claims, 5 Drawing Figures

LIGHT BEAM SCANNING APPARATUS

This is a continuation of application Ser. No. 724,722, filed Apr. 18, 1985, now abandoned.

BACKGROUND OF THE INVENTION

1. Field of the Invention

This invention relates to a light beam scanning apparatus for making a light beam scan by use of a mechanical light deflector, and more particularly to a light beam scanning apparatus provided with a scanning position correcting means in which the detection of the angular position of the light deflector and the detection of the displacement of the light beam scanning from the correct position are conducted by a common means whereby the correction of the position is conducted simultaneously with the generation of clock signals.

2. Description of the Prior Art

Heretofore, a light beam scanning apparatus which employs a mechanical light deflector such as a galvanometer mirror, a rotating polygonal mirror, a hologram scanner or the like is widely used in the various kinds of scanning recorder or scanning reader. In this kind of light beam scanning apparatus, there sometimes occurs a displacement of the scanning position in the direction perpendicular to the scanning direction due to the error in parallelism of the deflecting facets of the mechanical deflector or the wobbling of the deflecting facets. In order to correct this kind of displacement, it has been known to optically correct the light beam displacement or to drive a mechanical correcting deflector according to the signal indicative of the displacement to deflect the light beam in the direction perpendicular to the scanning direction by the amount to correct the displacement.

In the above-described light beam scanning apparatus provided with the displacement correcting means, it becomes necessary to detect the angular position of the light deflector in order to make synchronization between the recording signal or the read-out signal and the scanning position. Therefore, in case where a light deflector for correction is provided, there are needed a correction light deflector, a means for driving the correcting light deflector and a means for detecting the angular position of the light deflector, which complicates the structure around the light deflector and enhances the cost of the light beam scanning apparatus.

SUMMARY OF THE INVENTION

In view of the above drawbacks inherent in the conventional light beam scanning apparatus, the primary object of the present invention is to provide a light beam scanning apparatus in which the detection of the angular position of the light beam deflector and the detection of the displacement of the scanning light beam caused by the error in parallelism or wobbling of the light deflecting facets are conducted by a common means, whereby the correction of the displacement of the light beam in the direction perpendicular to the scanning direction is made simultaneously with the generation of the clock signal for determining the scanning position in the scanning direction.

The light beam scanning apparatus in accordance with the present invention is characterized in that a position detecting light beam generating means is provided for generating a light beam for position detection separately from the scanning light beam generating means, the position detecting light beam is caused to impinge upon a light deflector at a position substantially coincident with the position to deflect the scanning light beam but to deflect the light beam in the deflecting plane different from the deflecting plane for the scanning light beam (i.e. the position detecting light beam is deflected by the light beam deflector used for deflecting the scanning light beam so as to be deflected in a deflecting plane different from the deflecting plane in which the scanning light beam is deflected), the deflected position detecting light beam is converged by a converging optical system and the converged position of the light beam is detected by the light beam position detecting means, a signal processing circuit is provided for processing the output signal of the light beam position detecting means to output an angular position signal which indicates the angular position of the light beam deflector for the scanning light beam and also to output a deviation signal which indicates the deviation of the position detecting light beam in the direction perpendicular to the deflecting direction of the position detecting light beam, a correcting light beam deflector is provided for deflecting the scanning light beam in the direction perpendicular to the scanning direction to correct the deviation thereof, and the correcting light beam deflector is driven by a correcting light beam deflector driving control means according to said deviation signal input therein so as to correct the deviation of said position detecting light beam.

By making the deflecting position of the position detecting light beam coincident with the deflecting position of the scanning light beam, the deviation of the position detecting light beam corresponds to the deviation of the scanning light beam, and accordingly by driving the correcting light beam deflector in the direction by the amount to correct the deviation of the position detecting light beam the deviation of the scanning light beam can also be corrected. When as the light beam deflector a galvanometer mirror is used, both faces of the mirror are used for reflecting light beams and one face is used for reflecting the scanning light beam and the opposite face is used for reflecting the position detecting light beam and the light beams are caused to impinge upon the mirror on the opposite faces at the same position symmetrically with respect to the axis of rotation of the mirror. (In the present invention, the "coincidence" between the position of deflection of the light beams on the light beam deflector should be understood to include the above-mentioned case.)

DESCRIPTION OF THE PREFERRED EMBODIMENTS

Figure 1:
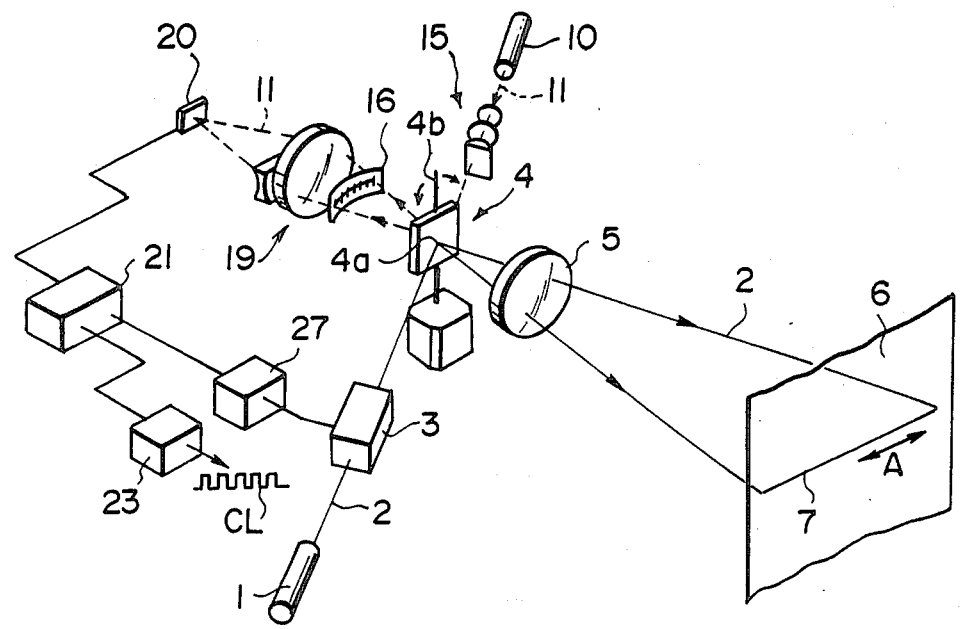
FIG. 1 is a schematic perspective view showing an embodiment of the light beam scanning apparatus in accordance with the present invention.

Now the present invention will be described with reference to the accompanying drawings in which FIG. 1 shows an embodiment thereof.

Referring to FIG. 1, a scanning light beam 2 emitted by a scanning light beam generating means 1 such as a laser source impinges upon a galvanometer mirror 4 as a scanning light beam deflector through a correcting light beam deflector 3 which will be described in detail later. The scanning light beam 2 is deflected by the galvanometer 4 at the deflecting point 4a and converged by a converging lens 5 such as an fθ-lens and scans a scanning plane 6 in the direction of arrow A. As for the scanning light beam generating means 1, a semiconductor laser, a gas laser, a light emitting diode laser or the like can be used.

Figure 2:
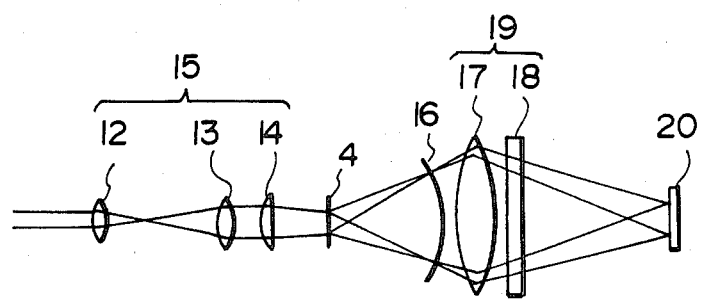
FIG. 2 is a plan view showing an example of the light converging optical system employed in the above embodiment of the present invention.
Figure 3:
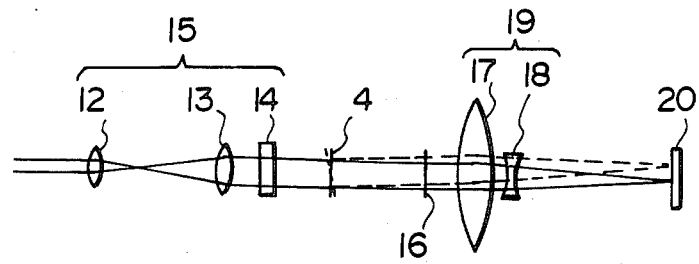
FIG. 3 is a side view showing the light converging optical system as shown in FIG. 2.

The galvanometer 4 has a mirror face on the back side thereof on which a position detecting light beam 11 emitted by a position detecting light beam generating means 10 impinges. For the position detecting light beam generating means 10, in addition to any light source as exemplified above for the scanning light beam generating means 1 a white light source can be used. FIGS. 2 and 3 show an optical system through which the position detecting light beam 11 is caused to pass in plan view and side view. Now the embodiment will be described referring to these figures, too.

The position detecting light beam 11 passes through the first converging optical system 15 consisting of a positive lens 12, a positive lens 13 and a cylindrical lens 14 and then impinges upon the galvanometer 4, where it is deflected. At this stage, the position detecting light beam 11 impinges upon the galvanometer mirror 4 at a deflecting position just behind the deflecting point 4a symmetrically with respect to the axis of rotation 4b of the mirror 4. In the path of the position detecting light beam 11 along the deflecting plane thereof, there is provided a grating pattern 16 having alternately arranged transparent portions and opaque portions located at a fixed spatial frequency along an arcuate line having its center at the axis of rotation 4b of the mirror 4. The position detecting light beam 11 passes through the grating pattern 16. Then, the position detecting light beam 11 is converged on a light beam position detector 20 by a second converging optical system 19 consisting of a positive lens 17 and a cylindrical lens 18. This converging is made in the direction perpendicular to the deflecting direction thereof. As the light beam position detector 20, for example, a continuous type or a split type semi-conductor position detector which detects the position of the light beam in the direction perpendicular to the deflecting plane of the position detecting light beam 11 one-dimensionally is used. The output of the light beam position detector 20 is input into the signal processing circuit 21.

Figure 4:
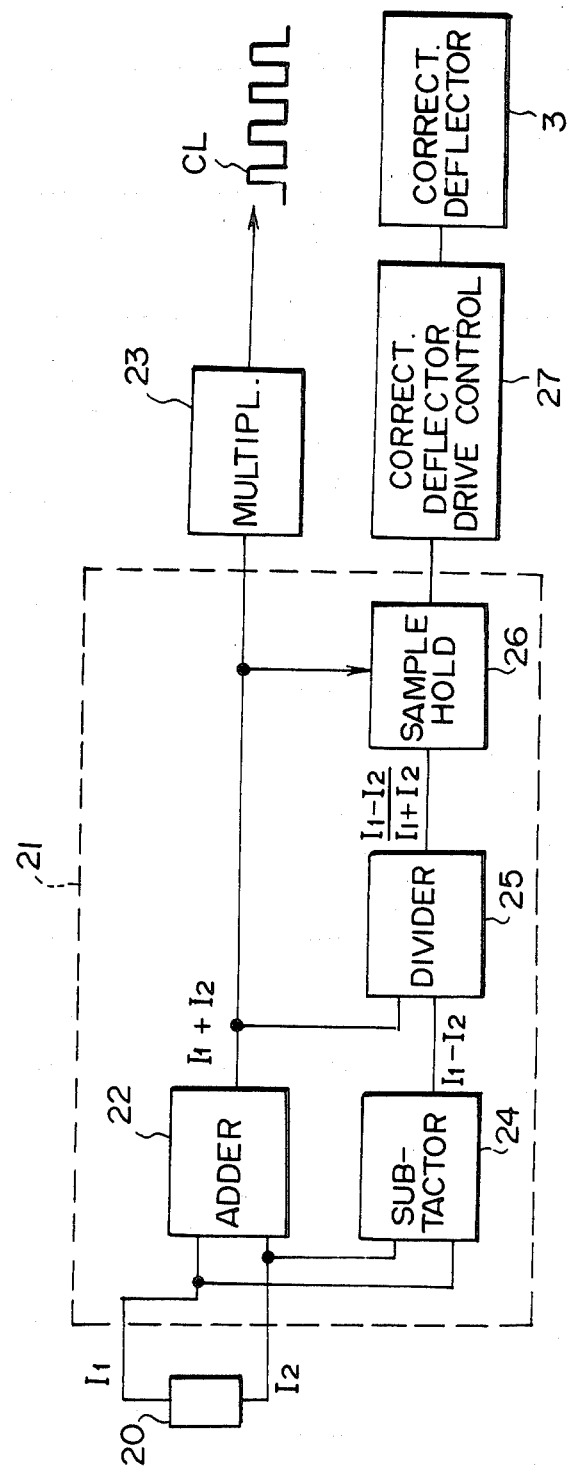
FIG. 4 is a block diagram of an electric circuit employed in the above-described embodiment of the present invention.

FIG. 4 shows the structure of the electric circuit including the signal processing circuit 21 in detail. Now referring to FIG. 4, the upper terminal output $I_1$ and the lower terminal output $I_2$ of the light beam position detector 20 are input into the adder 22 of the signal processing circuit 21, and the added signal $(I_1+I_2)$ is input into a multiplication circuit 23. Since the deflected position detecting light beam 11 passes through the grating pattern 16, the above added signal $(I_1+I_2)$ becomes a periodically fluctuating pulse signal. Therefore, by multiplying the frequency of the pulse signal by the multiplication circuit 23, a clock signal CL carrying the picture cell frequency can be obtained. The clock signal CL is used as a standard signal for scanning operation which indicates the angular position of the galvanometer mirror 4 in the light beam scanning recorder or a reader. The position detecting light beam 11, as shown in FIG. 2, is converged on the grating pattern 16 at least with respect to the deflecting direction by the first converging optical system 15, and accordingly, there can be obtained a clock signal CL which has a high resolving power and accuracy for detecting the position of the light beam by use of the grating pattern 16.

When there occurs wobbling in the galvanometer mirror 4, the scanning spot of the scanning light beam 2 is displaced in the direction perpendicular to the scanning direction, which results in deformation in the scanning line 7. At this stage, as shown in FIG. 3, the position detecting light beam 11 naturally deviates in the direction perpendicular to the deflecting direction corresponding to the deviation of the scanning light beam 2. In order to obtain the deviation, the upper terminal output $I_1$ and the lower terminal output $I_2$ are input into the differential circuit 24 of the signal processing circuit 21 to obtain the subtracted signal $(I_1-I_2)$. The normalized signal $(I_1-I_2)/(I_1+I_2)$ obtained by dividing the subtracted signal $(I_1-I_2)$ by the added signal $(I_1+I_2)$ indicates the direction and amount of the deviation or displacement of the position detecting light beam 11. The normalized signal $(I_1-I_2)/(I_1+I_2)$ is sample-held by a sample-hold circuit 26 and is put into the correcting light beam deflector driving control circuit 27 using said added signal $(I_1+I_2)$ as a synchronizing signal for every deflecting angle. Said correcting light beam deflector 3 is composed of for example a supersonic wave light deflector (acousto-optic light deflector: AOD), electro-optical light deflector (EOD), galvanometer mirror, electrostriction type light deflector or the like, and is made to deflect the scanning light beam 2 in the direction perpendicular to the scanning direction. The correcting light beam deflector driving control circuit 27 drives said correcting light beam deflector 3 to carry out the deflection of the deflecting direction and amount to correct said deviation or displacement according to the normalized signal $(I_1-I_2)/(I_1+I_2)$ which indicates the deviation of the position detecting light beam (corresponding to the displacement of the scanning light beam 2 as mentioned hereinbefore), whereby the deviation of the scanning spot of the scanning light beam 2 caused by the wobbling is cancelled and the distortion of the scanning line is avoided.

Figure 5:
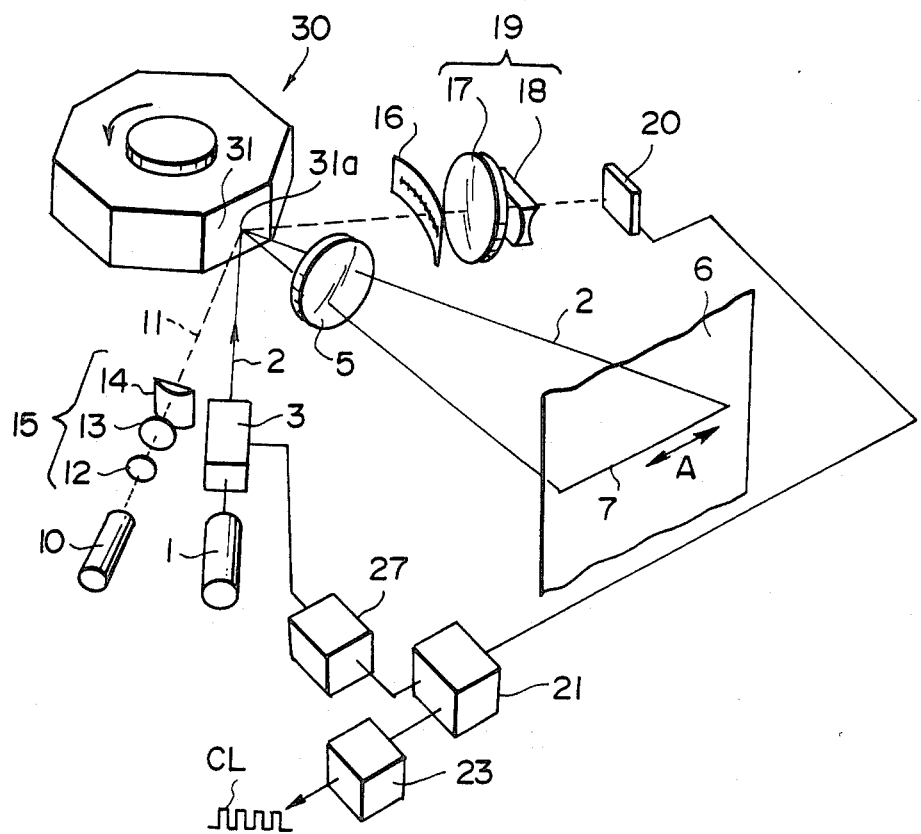
FIG. 5 is a schematic perspective view showing another embodiment of the light beam scanning apparatus in accordance with the present invention.

Hereinabove, an embodiment has been described in which a galvanometer mirror 4 is used as a scanning light beam deflector and the distortion of the scanning line caused by the wobbling of the galvanometer mirror 4 is corrected. However, the present invention is applicable not only to the above apparatus using the galvanometer mirror but also to the apparatus using other kind of scannning light deflector. FIG. 5 shows a second embodiment of the present invention in which a rotating polygonal mirror is used as the scanning light beam deflector.

Referring to FIG. 5, a scanning light beam 2 emitted by a scanning light beam generating means 1 impinges upon a facet 31 of a rotating polygonal mirror 30 by way of a correcting light deflector 3. The scanning light beam 2 is deflected at a deflecting point 31a of the rotating polygonal mirror 30 and is converged onto the scanning plane 6 through a converging lens 5 such as an fθ-lens and scans the scanning plane 6 in the direction of arrow A. At the deflecting point 31a, another beam 11 for detecting position emitted by a position detecting light beam generating means 10 impinges. The position detecting light beam 11 is, similarly to said embodiment, passed through a first converging optical system 15 and deflected at the deflecting point 31a and then converged onto a light beam position detector 21 by a second converging optical system 19 by way of a grating pattern 16.

In the second embodiment also, the scanning light beam 2 is sometimes deviated in the direction perpendicular to the scanning direction due to the error in parallelism or wobbling of the facets 31 of the rotating polygonal mirror 30. The deviation of the position detecting light beam corresponding to the deviation is detected by a light beam position detector 20 and a correcting light beam deflector 3 is driven to cancel or correct the deviation to correct the deviation or displacement of the scanning light beam 2.

As for the light beam position detector, a semi-conductor position detector as mentioned hereinbefore may be used as a one-dimension position detector, or a vidicon or image-sensor can be used as a two-dimensional position detector. In such a case, the angular position of the scanning light beam deflector can be obtained by detecting the position of the spot of the position detecting light beam. Further, the light converging optical system is not limited to the examples as shown in the foregoing embodiments, but may be of any type known in the art. Furthermore, the light beam scanning apparatus in accordance with the present invention may employ a hologram scanner as a mechanical light beam deflecting means.

It will also be noted that the position detecting light beam and the scanning light beam may be generated from a common light source and separated by a proper beam splitter.

I claim:

1. A light beam scanning apparatus for deflecting a light beam by means of a mechanical type light beam deflector comprising in combination;
    a scanning light beam generating means,
    a mechanical light beam deflecting means for deflecting a scanning light beam emitted by said scanning light beam generating means,
    a position detecting light beam generating means for generating a position detecting light beam and causing the position detecting light beam to impinge upon said mechanical light beam deflecting means at a position substantially coincident with the position where said scanning light beam is deflected thereby,
    a converging optical system for converging the position detecting light beam deflected by said deflecting means,
    a light beam position detecting means provided on the plane on which said position detecting light beam is converged for detecting the position where the position detecting light beam is converged,
    a signal processing circuit which processes the output signal from said light beam position detecting means and outputs an angular position signal indicative of the angular position of said mechanical light beam deflecting means and a deviation signal indicative of the deviation of the position detecting light beam in the direction perpendicular to the deflecting direction,
    a correcting light beam deflector for deflecting the scanning light beam before the scanning light beam impinges upon the scanning light beam deflector in the direction perpendicular to the scanning direction at the time of scanning, and
    a correcting light beam deflector driving control means which receives said deviation signal and drives said correcting light beam deflector in such a manner as to correct the deviation.

2. A light beam scanning apparatus as defined in claim 1 wherein said light beam position detecting means is located on a deflecting plane of the position detecting light beam and is composed of a grating pattern having transparent portions and opaque portions arranged alternately in the deflecting direction of the light beam and a one-dimensional position detector which detects the deviation of the position detecting light beam in the direction perpendicular to the deflecting direction thereof, and said signal processing circuit detects the angular position of the scanning light beam deflector by detecting the periodical fluctuation of the output of the one-dimensional position detector caused by the grating pattern.

3. A light beam scanning apparatus as defined in claim 1 wherein said mechanical light beam deflecting means is a galvanometer mirror.

4. A light beam scanning apparatus as defined in claim 3 wherein said position detecting light beam impinges upon one face of the galvanometer mirror and said scanning light beam impinges upon the opposite face of the galvanometer mirror, and the point at which the position detecting light beam impinges on one face and the point at which the scanning light beam impinges on the opposite face are located in symmetry with each other with respect to the axis of rotation of the galvanometer.

5. A light beam scanning apparatus as defined in claim 1 wherein said mechanical light beam deflecting means is a rotating polygonal mirror.

6. A light beam scanning apparatus as defined in claim 5 wherein said position detecting light beam impinges upon the same facet of the rotating polygonal mirror as that on which the scanning light beam impinges, the point at which the position detecting light beam impinges being the same as the point at which the scanning light beam impinges.

* * * * *